P. SODERLUND.
Corn-Plow.
No. 206,752.    Patented Aug. 6, 1878.
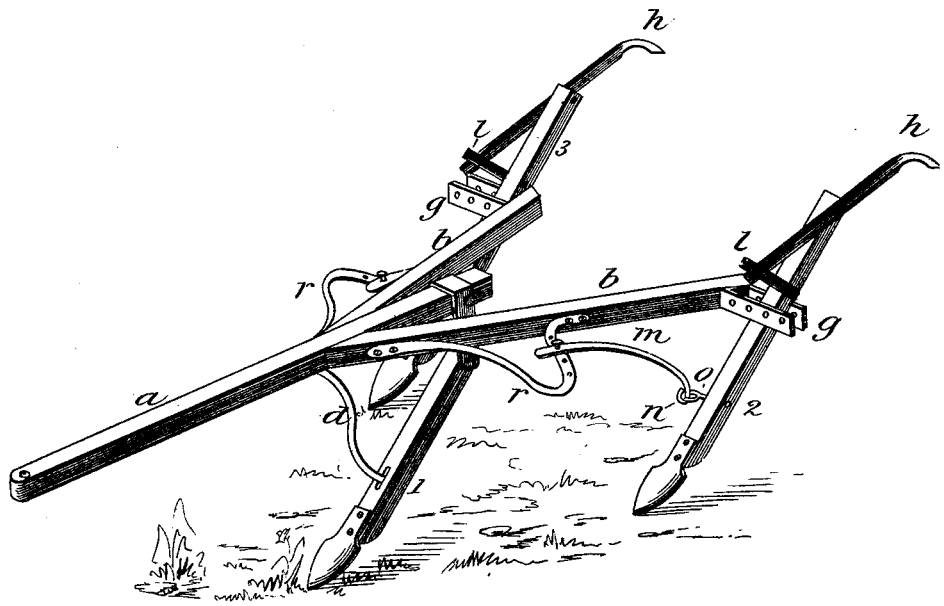
Attest:
Arthur Stimson
P. C. Kenyon
Inventor:
Peter Soderlund,
By Thomas G. Orwig
Attorney

UNITED STATES PATENT OFFICE.

PETER SODERLUND, OF SWEDE POINT, IOWA.

IMPROVEMENT IN CORN-PLOWS.

Specification forming part of Letters Patent No. 206,752, dated August 6, 1878; application filed May 11, 1877.

*To all whom it may concern:*

Be it known that I, PETER SODERLUND, of Swede Point, in the county of Boone and State of Iowa, have invented an Improved Corn Plow and Cultivator, of which the following is a specification:

The object of my invention is to construct a cultivator in such a manner that its plows or shovels can be independently controlled to move to or from the plants, and to make zigzag lines of advance, as required, along crooked rows, and the complete cultivator alternately spread and contracted while in motion to accommodate itself to the varying width of space between rows.

It consists in pivoting standards in swivel-form bearers and connecting them with the branches of a forked beam; in adjustable handles, combined direct with the rear and outside standards, and with a central and guiding-standard in the fork of the beam, all as hereinafter fully set forth.

The drawing is a perspective view illustrating the construction and operation of my complete invention.

$a$ is a straight beam. $b \cdot b$ are branches, rigidly secured to the sides and rear end of the beam $a$, to angle rearward in opposite directions.

1 is a central standard, pivoted in a bifurcated bearer, $c$, in such a manner that it will have vertical or longitudinal play and adjustment and no lateral motion. The bearer $c$ is rigidly secured to the rear end of the straight beam $a$ in the fork of the complete beam.

$d$ is a brace, extending from the under side of the beam to the standard, and is secured thereto by means of a wooden pin in a common way to allow adjustment and the release of the standard when its shovel meets immovable obstructions.

2 and 3 are standards, attached on the outsides and rear ends of the beam-branches $b \, b$, by means of bifurcated bearers $g$, in such a manner that they will have a constant lateral play, and can also be readily adjusted vertically to change their angles relative to the beam, as required, to govern the depth of their shovels in the ground.

The standard-bearers $g$ have a series of holes for adjusting the standards relative to the beams $b$. They may be cast complete in one piece and swiveled to the branch beams $b$ by means of a shank on their ends or a bolt passed through them, or in any suitable way to produce a swivel-form connection with the beam.

$h \, h$ are handles, pivoted and clamped to the top ends of the standards 1 and 2 in such a manner that they can be readily raised and lowered to accommodate themselves to the height of the man or boy operating the cultivator.

$l \, l$ are perforated braces, rigidly secured to the standards, and connected with the lower ends of the handles $h$ by movable pins or bolts.

$m \, m$ are braces connected with the standards 2 and 3, by means of linked key-bolts $n$ and swiveled bearers $o$, in such a manner as to allow lateral and also vertical play and motion to the standards 2 and 3 and their shovels.

$r \, r$ are fixed and perforated stay-bearers, bolted and clamped to the sides of the beam, to extend laterally to serve as a means of securing and adjusting the upper and front ends of the braces $m$, swiveled to the standards 2 and 3. They have a series of perforations, in which the perforated ends of the braces or stays $m$ may be adjusted to correspond with the position of the standards relative to the beam and the surface of the ground.

From the detailed description of the various parts of my cultivator and their functions the practical operation of my complete invention is obvious, and any person of ordinary skill can readily understand and work it successfully and advantageously.

I am aware that cultivator-standards have been pivoted so that they could be moved laterally relative to the central line of advance, and that adjustable cultivator-handles have been used; but I claim that my manner of suspending and adjusting standards by means of bifurcated, perforated, and swiveled bearers $g$, carried by the rigid branches of a forked beam, and connecting adjustable handles direct with the top ends of the vibratory standards, is novel and greatly advantageous, in that it allows the operator better and more instantaneous control of the plows or shovels carried by the vibratory standards, a desideratum greatly to be desired in doing rapid and efficient work without damaging plants, as frequently occurs when cultivator-standards have no side play or cannot be instantly moved to and from plants at the will of the operator, and while the cultivator is moving speedily between two rows of plants.

I claim as my invention—

1. In a corn plow and cultivator, the swivel-form, bifurcated, and perforated standard-bearers $g\ g$, carrying the pivoted and adjustable standards 2 and 3, in combination with rigid branches $b\ b$ of the beam $a$, substantially as and for the purposes shown and described.

2. The adjustable braces or stays $m$, linked key-bolts $n$, swiveled bearers $o$, and fixed fastenings and adjusting devices $r$, in combination with a plow-beam and a plow-standard, substantially as and for the purposes shown and described.

3. The rigid forked beam $a\ b\ b$, the central, front pivotal, and guiding standard 1, the adjustable pivoted and swiveled standards 2 and 3, each carrying an adjustable handle, $h$, arranged and combined to operate substantially as and for the purposes shown and described.

PETER SODERLUND.

Witnesses:
JOHN BILSLAND,
JOHN CARR.